United States Patent [19]
Salin

[11] Patent Number: 5,628,051
[45] Date of Patent: May 6, 1997

[54] METHOD FOR STARTING A MESSAGE TRANSMISSION IN A MOBILE TELEPHONE NETWORK

[75] Inventor: Hannu-Pekka Salin, Vantaa, Finland

[73] Assignee: Nokia Telecommunications Oy, Espoo, Finland

[21] Appl. No.: 302,805

[22] PCT Filed: Jan. 10, 1994

[86] PCT No.: PCT/FI94/00009

§ 371 Date: Sep. 15, 1994

§ 102(e) Date: Sep. 15, 1994

[87] PCT Pub. No.: WO94/16532

PCT Pub. Date: Jul. 21, 1994

[30] Foreign Application Priority Data

Jan. 15, 1993 [FI] Finland .................................. 930172

[51] Int. Cl.[6] .................................. H04Q 7/22
[52] U.S. Cl. .................. 455/33.1; 455/53.1; 379/59
[58] Field of Search ............................ 455/33.1, 53.1, 455/54.1, 54.2, 56.1, 68, 186.1; 370/110.1; 379/58, 59, 63

[56] References Cited

U.S. PATENT DOCUMENTS

| | | | |
|---|---|---|---|
| 5,136,585 | 8/1992 | Nazamuddin et al. | 370/110.1 |
| 5,204,861 | 4/1993 | Wiebe | 370/110.1 |
| 5,351,235 | 9/1994 | Lahtinen | 455/53.1 |
| 5,404,580 | 4/1995 | Simpson et al. | 455/186.1 |
| 5,487,071 | 1/1996 | Nordstrand et al. | 455/68 |

FOREIGN PATENT DOCUMENTS 2244409 11/1991 United Kingdom .
9326131 12/1993 WIPO .

OTHER PUBLICATIONS

Recommendation GSM 03.04 "Technical Realization of the Short Message Service–Point–to–point" version 3.5.0.ETSI/PT12, Feb. 1992, see especially pp. 13–14,20.
Recommendation GSM 04.11 "Point to Point Short Message Service Support on mobile Radio Interface" version 3.2.0, ETSI/PT 12, Feb. 1992, see p. 17.
Recommendation GSM 09.02, "Mobile Application Part Specification", version 3.8.0 RTSI/PT 12, Jan. 19999999999991, see pp. 325 –326, 336 –338.

*Primary Examiner*—Edward F. Urban
*Attorney, Agent, or Firm*—Cushman Darby & Cushman, IP Group of Pillsbury Madison & Sutro, L.L.P.

[57] ABSTRACT

A method and a home location register for starting a short message transmission in a mobile telephone network. To ensure that a short message is delivered successfully, a time supervision is started upon including an identity of a short message service centre in a subscriber-specific list. When a time preset in the time supervision expires, a short message transmission starting message is transmitted to each one of the short message service centres the identity of which is included in the list. The identity of the short message service centre is deleted from the list contained in the home location register. Each short message service centre transmits, in response to a short message transmission starting message, the short message to a gateway mobile exchange for the short message to be forwarded to the subscriber.

11 Claims, 5 Drawing Sheets

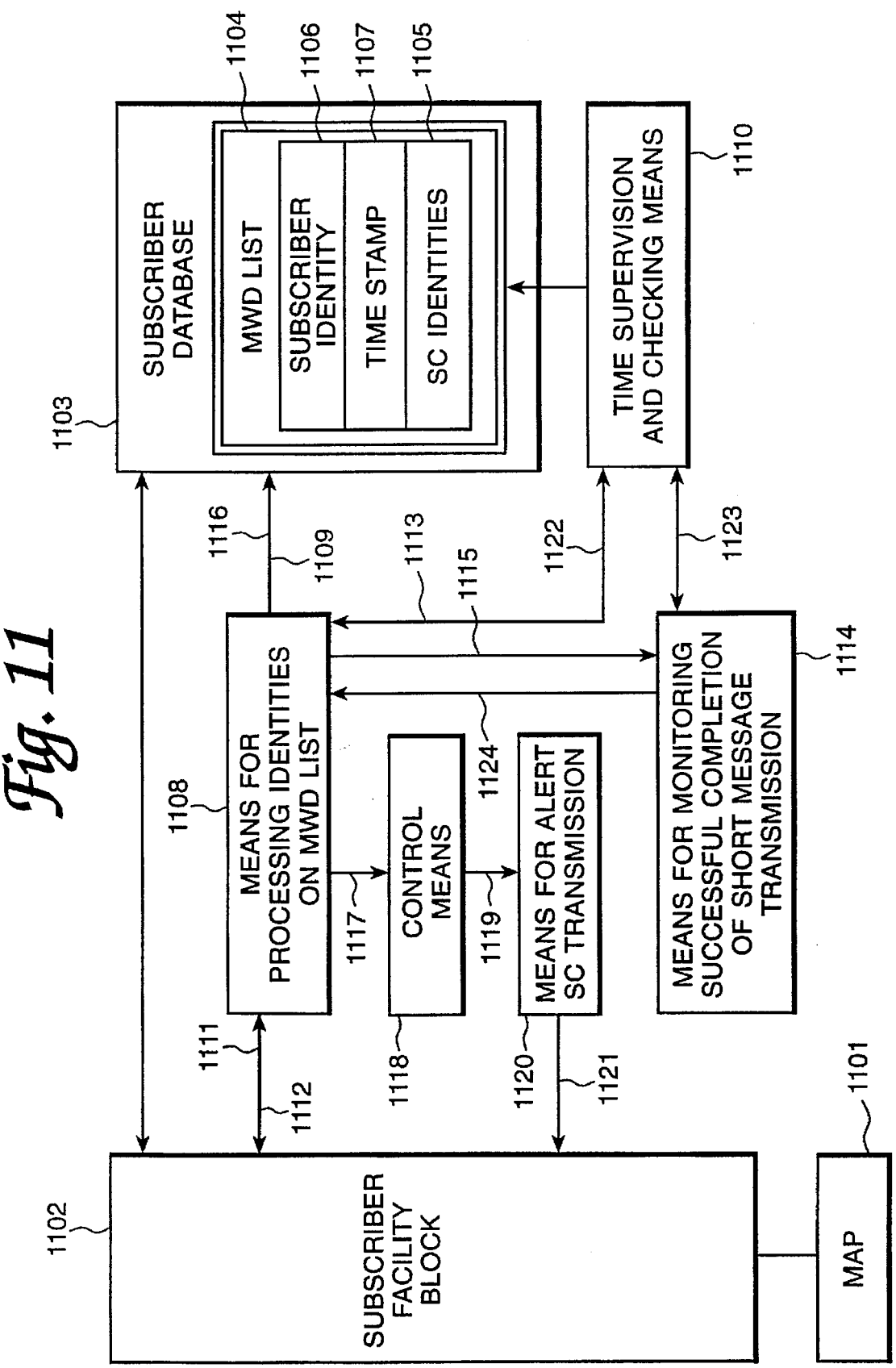

METHOD FOR STARTING A MESSAGE TRANSMISSION IN A MOBILE TELEPHONE NETWORK

BACKGROUND OF THE INVENTION

The invention relates to a method for starting a short message transmission in a mobile telephone network comprising at least one short message service centre having an identity and transmitting short messages; at least one gateway mobile exchange forwarding short messages; at least one mobile exchange forwarding short messages; a subscriber capable of receiving short messages; and a home location register having a subscriber-specific list of identities of short message service centres that have transmitted rejected short messages, a subscriber-specific short message transmission starting message from the home location register activating the short message service centre to transmit a short message to the gateway mobile exchange in order for the short message to be forwarded to the subscriber, wherein the rejected short messages are stored in the short message service centre.

In cellular radio networks it is known to send short messages via a short message service centre separate from the cellular radio network. One system for sending and forwarding short messages is described in GSM 03.40, February 1992, *Technical Realization of Short Message Services Point to Point*, ETSI/PT. The specification describes the interfacing of a short message service centre (SC) to the mobile exchange of a cellular radio network, and the operation of the SC when it sends and forwards short messages from outside the cellular radio network and from one subscriber (A subscriber) to another (B subscriber) in the cellular radio network, or to an external message means capable of receiving and/or sending short messages. The transfer of short messages over a radio path between GSM terminal equipment, a mobile exchange and a short message service centre is described more closely in GSM 04.11, February 1992, *MS-BSS Interface—Support of Short Message Service* (p-p), ETSI/PT 12.

FIG. 4 of the attached drawings shows a situation preceding the arising of the problem associated with the prior art. A short message service centre SC1 sends 400 a short message to a gateway mobile exchange GMSC, which requests 401 for routing information from the home location register HLR of the subscriber by a SendRoutingInfoForSM message. The HLR sends 402 the required routing information (Routing-Info), i.e. the identity of the mobile exchange of the assumed location area of the subscriber to the gateway mobile exchange GMSC, which sends 403 the short message (ForwardShortMessage) received by it to the mobile exchange VMSC/VLR of the assumed location area of the subscriber. As the subscriber is not reachable 404, the visitor location register VLR sets the MWF flag of the subscriber, i.e. the VLR message waiting flag, illustrated in FIG. 2. There is one message waiting flag for each International Mobile Subscriber Number IMSI. If there are messages addressed to the subscriber the transmission of which has not been completed successfully, the Message Waiting Flag is in the position True T, and if there are no messages addressed to the subscriber, the flag is in the position False F. If the flag is in the position T, the VLR monitors whether the subscriber establishes a connection to the mobile network. If the subscriber establishes a connection to the mobile network, the HLR of the subscriber has to be informed of the connection establishment. Moreover, as the subscriber has not been reachable, the VMSC/VLR sends 405 a negative acknowledgement message (ForwardShortMessageNegativeAcknowledge), which indicates to the GMSC that the subscriber is not reachable. The GMSC thereby sends 406 an activation message (SetMessageWaitingData) to the HLR of the subscriber, which message activates the HLR to make up 407 a Message Waiting Data List, i.e. a MWD list, in compliance with GSM 03.40. For each B subscriber the MWD list stores, on the basis of the IMSI of each subscriber and the MSISDN numbers msisdn associated with the IMSI, the addresses Sc1, Sc2 of short message centres SC storing short messages waiting to be transmitted to the subscriber. This list is shown in FIG. 3. The HLR of the subscriber indicates that the MWD list has been made up 407 by sending 408 an acknowledgement message (SetMWDPositiveAcknowledge) to the GMSC, which sends 409 a negative acknowledgement message (ShortMessageNack) indicating an unsuccessful short message transmission to the short message service centre SC1, which made the short message transmission attempt to the subscriber. The SC1 thereby stores 410 in its memory the short message, which it attempted to transmit to the subscriber. Short messages are stored in the memory of the SC in such a manner as shown in FIG. 1B, that is, the short messages SM 1 and SM 2 correspond to the MSISDN number MSISDN to which the messages are to be sent.

FIG. 5 shows a situation in which the subscriber is not reachable, and the MWD list of the HLR of the subscriber contains the identities of SCs storing short messages waiting to be transmitted to the subscriber in their memories. Further, in the situation shown in FIG. 5, an MWF flag is set in the VLR of the subscriber location area, which flag indicates that the HLR of the subscriber has to be informed if the subscriber establishes a connection with the network. Accordingly, when another short message service centre SC2 sends 501 a new short message (ShortMessage) to the same subscriber to which there has already been a short message transmission attempt, the GMSC requests for routing information for the short message from the HLR of the subscriber by sending 502 a routing information request message (SendRoutingInfoForSM). As the MWD list of the HLR already contains the identity of at least one SC that has attempted a short message transmission to the subscriber, but the subscriber has not been reachable, the HLR sends 504 a negative acknowledgement (RoutingInfoNack) to the routing information request made by the GMSC. The GMSC forwards information about the unsuccessful transmission of the short message by sending 505 a negative acknowledgement (ShortMessageNack) to the short message service centre SC2, which further stores the rejected short message in its memory, as shown in FIG. 1B. The short messages are stored in the memory of the SC on the basis of the MSISDN number of the recipient of the short message so that the messages SM 1, SM 2 to each MSISDN number are stored in connection with this particular MSISDN number MSISDN.

FIG. 6 shows a situation in which the subscriber recovers operation in the network, undergoes location updating, or changes its location area. In such cases, a short message can be transmitted to the mobile telephone of the subscriber, and the visitor location register VMSC/VLR within the area of which the subscriber registers sends 601 information (NoteMSPresent or UpdateLocation) about the reappearance of the subscriber in the network to the HLR of the subscriber. The transmission of NoteMSPresent takes place as the MWF (Message Waiting Flag) is set in the concerned VLR, and so the VLR will indicate to the HLR that the subscriber is again reachable. The indication that the subscriber is again reachable is forwarded to the HLR of the subscriber even in cases where this would not be necessary, e.g. when the subscriber re-registers in the network within the service area of the same VLR the area of which it left. When the HLR of the subscriber receives information indicating that the subscriber is again reachable in the network, it starts to send 602, 604 Alert messages to the SCs included in the MWD list of the concerned subscriber so as to indicate them that the subscriber has become active within the area of the cellular radio network and that the transmission of the short message to the mobile telephone of the subscriber can again be attempted. The HLR sends 602, 604 these messages (Alert SC1, Alert SC2) via the gateway mobile exchange GMSC/IWMSC to the respective short message service centres SC1 and SC2, and provides the messages 603, 605 (Alert (msisdn)) with the msisdn numbers of the subscriber. A situation described above may occur, e.g. when the subscriber has switched off the mobile telephone overnight and switches it on in the morning, or correspondingly, if the subscriber uses the mobile telephone at work and switches it on at the beginning of the working day. Alert messages initiate the transmission of the subscriber's short messages from the SCs through the cellular radio system to the subscriber. Short messages are stored in the SC on the basis of the subscriber's Mobile Station International PSTN/ISDN Number.

The problem to be solved by the invention arises when short messages to be transmitted to the subscriber are stored in at least one of the short message service centres SC1, SC2, and the subscriber has not been reachable for some reason, and so the transmission of the waiting short messages to the subscriber has failed. When the subscriber is connected to the network, the VLR within the service area of which this particular subscriber registers attempts to send information indicating that the subscriber has recovered operation in the network to the HLR of the subscriber. Now, if the indication message (NoteMSPresent), which the visitor location register VMSC/VLR of the subscriber location area sends 601 to the HLR of the subscriber, is lost, the HLR of the subscriber will not be provided effectively with an indication that the subscriber is again reachable, and thus the HLR will not send the alert message, the reception of which would enable the short message service centre SC1, SC2 to send the short message via the GMSC/IWMSC to the subscriber.

In other words, when the subscriber is again reachable and the VLR sends to the HLR a message indicating that the subscriber is again reachable, i.e. the NoteMSPresent message, the transmission of which is an unacknowledged service, the VLR will not receive an acknowledgement of the successful transmission of the message from the HLR. The VLR of the subscriber location area thereby sets its own MessageWaitingFlag MWF to a value False after having sent the above-mentioned indication message. Thus, if the indication message should be lost on its way to the HLR, e.g. due to the overload of the transmission network or the recipient HLR or for some other reason, it may happen that the MWD list of the HLR contains addresses of short message service centres SC1, SC2 storing short messages waiting to be transmitted to subscribers which actually are reachable within the area of the cellular radio network. At the same time, however, the MWF flag is not set in the VLR, i.e. the flag is set to the value False, and so the subscriber supposes that none of the SCs stores short messages waiting to be transmitted to it. In this situation, a normal short message transmission to a subscriber that is reachable will fail as the HLR conceives that the subscriber is not reachable. It is to be noted that the problem does not occur with priority short messages since an attempt is always made to deliver them to the subscriber irrespective of whether the subscriber is reachable or not.

In the prior art case, the problem situation will not ease off until the subscriber changes its location area and moves to the service area of another VLR, and the HLR of the subscriber is informed of this. In this kind of situation, the new VLR performs location updating by sending a location updating message to the HLR of the subscriber. According to the GSM recommendations, the location updating is an acknowledged service and so the location updating message cannot be lost unnoticed. On the receipt of the location updating message, the HLR deletes the identities of the short message centres, that is, the SC addresses, from the MWD list.

The above-described problem situation is extremely difficult for a subscriber always roaming within the service area of the same VLR, since, if it happens once that an indication that the subscriber is again reachable is lost between the VLR and the HLR, the subscriber will never more receive any normal short messages addressed to it. A typical feature of the present-day cellular radio systems is that the service area of a single VLR covers a very large geographical area, and so it is highly probable that in the above-described error situation the subscriber will not notice for a long time that there are short messages waiting to be transmitted to the subscriber.

SUMMARY OF THE INVENTION

The object of the present invention is to offer a method and a home location register used in the realization of the method, by means of which the problems of the prior art can be avoided. In other words, the invention allows a short message stored in a short message service centre of a mobile telephone network to be forwarded to the subscriber even in cases where an indication message sent by the mobile exchange of the subscriber location area to the HLR of the subscriber so as to indicate that the subscriber is again reachable is lost, and the HLR of the subscriber conceives that the subscriber is not reachable, i.e. that the subscriber is not connected to the mobile telephone network.

This new method for starting a short message transmission is achieved by a method according to the invention which is characterized in that a time supervision is started when the identity of the short message service centre is included in the subscriber-specific list; a subscriber-specific short message transmission starting message is transmitted to all short message service centres having their identities on the subscriber-specific list when the time preset in the time supervision expires; the identity of the short message service centre to which the short message transmission starting message has been transmitted is deleted from the home location register's subscriber-specific list of the identities of short message service centres that have transmitted rejected short messages; each one of the short message service centres transmits, in response to the short message transmission starting message, a short message to the gateway mobile exchange for it to be forwarded to the subscriber.

The invention further relates to a method for starting a short message transmission in a mobile telephone network comprising at least one short message service centre having an identity and transmitting short messages; at least one gateway mobile exchange forwarding short messages; at least one mobile exchange forwarding short messages; a subscriber capable of receiving short messages; and a home location register having a subscriber-specific list of identities of short message service centres that have transmitted rejected short messages, a subscriber-specific short message transmission starting message from the home location register activating the short message service centre to transmit a short message to the gateway mobile exchange in order for the short message to be forwarded to the subscriber, and the rejected short messages being stored in the short message service centre. This method is characterized in that a time supervision is started when the identity of the short message service centre is included in the subscriber-specific list; when the time preset in the time supervision expires, the home location register transmits, in response to a routing information request message from the mobile exchange that has received the short message to be forwarded from the short message services centre, routing information required to forward the short message to the subscriber to the gateway mobile exchange, which attempts to transmit the short message to the subscriber.

The concept of the invention further covers a home location register in a mobile telephone system, comprising a memory means for storing subscriber information in a subscriber database and a subscriber-specific list of identities of short message service centres that have transmitted rejected short messages; a subscriber facility unit for forwarding messages between the subscriber database and the other components of the mobile telephone system; a means for processing the identities of the short message service centres that have transmitted rejected short messages; a means for transmitting a short message transmission starting message to the short message service centre; a control means for controlling the means for transmitting a short message transmission starting message so that it will transmit a short message transmission starting message to the short message service centre. The home location register according to the invention is characterized in that it further comprises: a means for starting a first time supervision associated with the identities of the short message service centres that have transmitted rejected short messages stored in the memory means; and a means for checking the expiry of the first time supervision in response to a short message transmission routing information request message from the gateway mobile exchange, and activating, in response to the expiry, the control means for the means for transmitting a short message transmission starting message so that it activates the transmission of a short message transmission starting message to the short message service centre.

The invention is based on the idea that at the same time as the identity of a SC is included in the MWD list of the HLR of the mobile telephone network, a time supervision associated with the SC identity is included in the list. When the time preset in the time supervision expires, a short message transmission starting message is sent to all SCs the identity of which is stored in the MWD list for the short messages to be transmitted to the respective subscriber. Upon receiving the starting message, the SCs send the short messages addressed to the subscriber through the mobile telephone network to the subscriber.

Another embodiment of the invention is based on the fact that the above-mentioned transmission of short message transmission starting messages on the basis of the time supervision takes place in response to a routing information request message sent by a mobile exchange which has received a short message from a SC for further transmission.

An advantage of this kind of method for starting a short message transmission in a mobile telephone network, and of a home location register of a mobile telephone system is that they solve the problem associated with the prior art, i.e. the problem arising if a notification sent by the VLR of the mobile exchange of the subscriber location area to the HLR of the subscriber in order to notify the HLR that the subscriber is again reachable is lost, and the SC stores a short message to be transmitted to the subscriber. In other words, the invention allows the transmission of short messages in the above situation.

BRIEF DESCRIPTION OF THE DRAWINGS

In the following the invention will be described in greater detail with reference to the attached drawings, in which:

FIG. 11 is a block diagram of a HLR according to the invention in a mobile telephone network.

DETAILED DESCRIPTION

The method according to the invention will be described below in connection with the digital GSM mobile radio system, which is the primary application area of the invention. However, the method according to the invention may also be applied in other similar radio systems or in the modifications of the GSM system. The basic configuration and basic functions of the GSM mobile radio system are well-known to one skilled in the art and are relatively accurately defined in the specifications of the GSM system, particularly: GSM Recommendations 01.02; 11.30; 11.31; 11.32; 03.40.

Figure 1A:
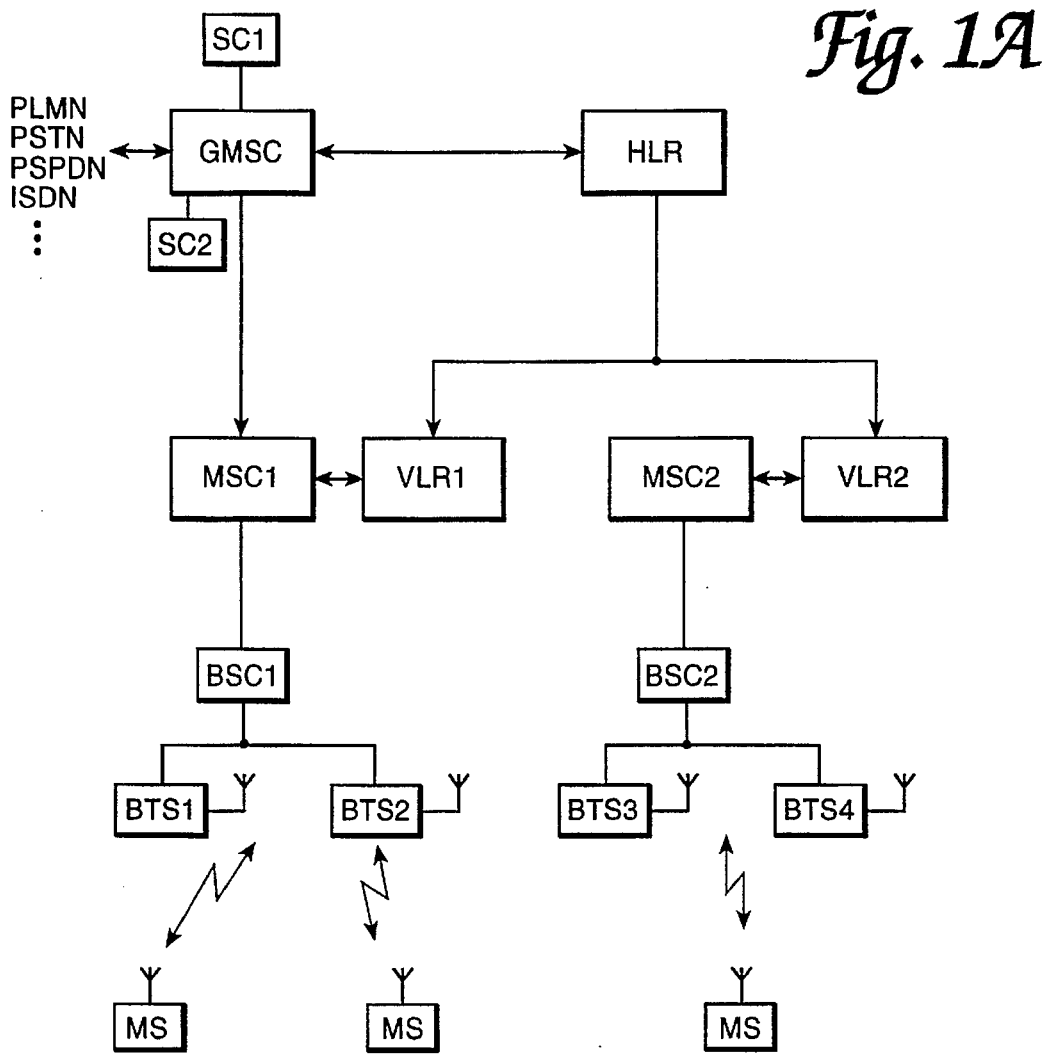
FIG. 1A shows a mobile telephone network and associated SCs and a mobile subscriber.
Figure 1B:
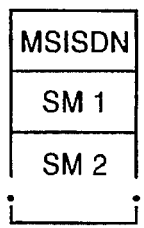
FIG. 1B is a simplified view of one possible SC memory hierarchy.

A GSM network, shown in FIG. 1A, usually comprises a single home location register HLR, which is a database storing permanently the data of the mobile telephone, such as the location data of the mobile telephone. The system also contains several visitor location registers VLR, one or more for each service area. The VLR is a database storing the data of the mobile telephone while the mobile telephone visits the service area of the VLR, i.e. within the location area of the mobile telephone. The VLR knows the location of the mobile telephone MS with the accuracy of one location area (LAI). The HLR, in turn, knows which VLR area the mobile telephone MS visits and provides mobile telephone terminated calls with routing information to the telephone network, i.e. the VLR address of the location area of the B subscriber. The HLR, in turn, receives the required routing information from the VLR. The HLR and VLR have merely a signalling connection to other components in the mobile radio network. In the system shown in FIG. 1A, each service area has a dedicated VLR connected to the mobile exchange MSC of the respective service area. The figure shows two service areas, one of which comprises a mobile exchange MSC1 and a visitor location register VLR1, while the other comprises a mobile exchange MSC2 and a visitor location register VLR2. Each service area contains one or more location areas, and traffic is controlled within each location area by a base station controller BSC, which controls several fixed radio stations, i.e. base transceiver stations BTS. Each one of the above-mentioned radio cells comprises a single base station BTS, and each base station controller BSC provides services for several cells. A mobile telephone MS residing in the cell establishes a two-way radio connection with the base station BTS of the cell. Both a signalling connection and speech channels are established between the base station controller BSC and the mobile exchange MSC. The mobile exchange MSC1 controls the base station controller BSC1, which in turn controls base stations BTS1 and BTS2. Correspondingly, the MSC2 within the other service area controls the location area comprising a base station controller BSC2 and base stations BTS3 and BTS4.

The GSM network is usually connected to other networks, such as a public switched telephone network PSTN, another mobile radio network PLMN, a packet-switched data network PSPDN, an ISDN or a short message service centre SC, via a specific mobile exchange called a gateway-MSC GMSC. One or more (or all) of the mobile exchanges of the network may operate as a GMSC. A speech channel connection can be switched from the GMSC to any other mobile exchange MSC of the network. The GMSC also has a signalling connection with the HLR. The HLR, in turn, has a signalling connection with the VLRs. Alternatively, the exchange of another data transmission system, such as an ISDN exchange, may also operate as a GMSC. FIG. 1A shows short message service centres SC1 and SC2 which deliver a short message over the cellular radio network to the mobile telephone MS of the B subscriber. If the short message cannot be delivered to the subscriber, the SC stores it in its memory, and the short message will be delivered to the subscriber MS when the subscriber is again reachable, provided that the SC is notified that the subscriber has become reachable.

Figure 7:
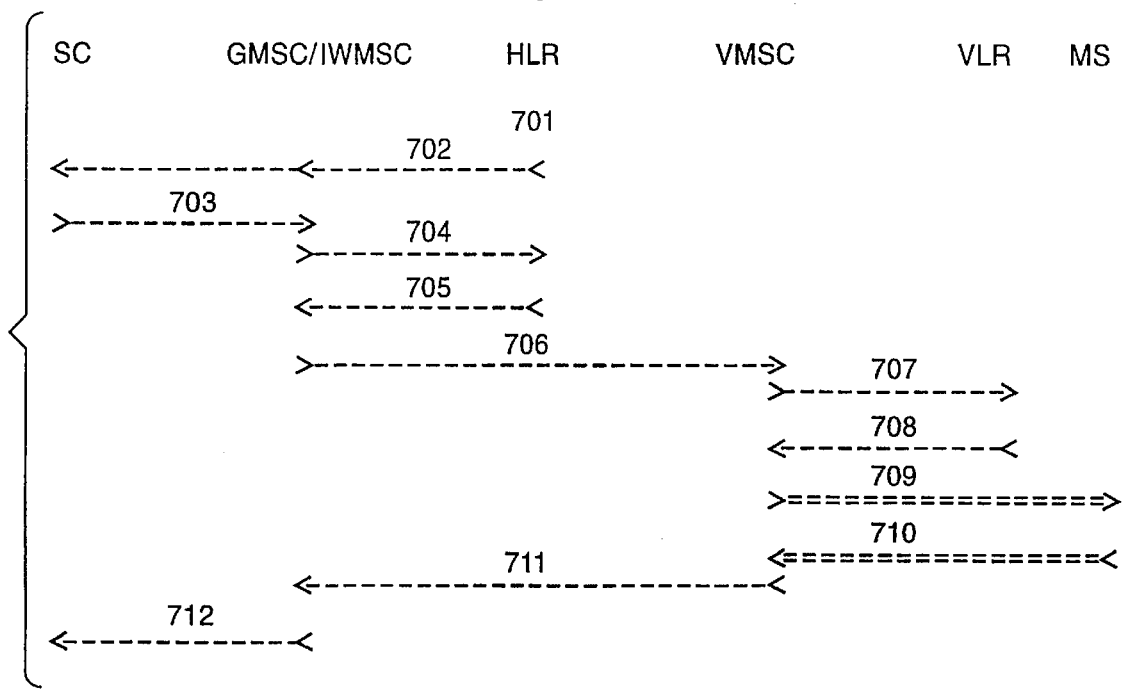
FIG. 7 is a signalling and transaction diagram illustrating a method according to the invention in which the starting of short message transmissions depends on the expiry of time supervision in a situation when the subscriber is again reachable.

FIG. 7 shows a signalling and transaction diagram illustrating the method according to the invention, in which the starting of the transmission of a short message waiting to be transmitted in the SC depends on the expiry of time supervision in a situation when the subscriber has become reachable. The figure shows a short message centre SC, a gateway mobile exchange GMSC/IWMSC, a subscriber HLR, a mobile exchange VMSC of the subscriber location area, a visitor location register VLR of the subscriber location area, and a mobile subscriber MS. When the time supervision set in the HLR according to the invention expires 701, the HLR sends 702 a short-message transmission starting message (Alert SC) to the SC storing one or more short messages to be transmitted to the subscriber. Upon receiving the starting message (Alert SC) the SC sends the short message to the GMSC/IWMSC, which sends 704 a routing information request message (SendRoutingInfoForShortMessage) to the HLR of the subscriber to which the short message to be transmitted is addressed. The HLR sends 705 routing information (RoutingInformation) to the GMSC/IWMSC, which sends 706, on the basis of the routing information, the short message to be transmitted (ForwardShortMessage) to the VMSC of the location area of the mobile subscriber, and the VMSC forwards it to the subscriber. Upon receiving the short message to be forwarded, the VMSC of the location area of the subscriber sends 707 a subscriber information request message (SendInfoForIcCall) to the VLR of the location area, which responds by sending 708 a message (CompleteCall) indicating a successful connection establishment and containing accurate information about the subscriber location area, i.e. the subscriber LAI (Location Area Identifier), to the VMSC, which sends 709 a short message (ShortMessage to MS) over the radio path to the subscriber MS. In the figure, the transmission over the radio path is indicated by a double arrow. Naturally, the actual short message transmission to the radio path is performed by a radio transmitter included in the mobile exchange or its base station. Upon receiving the short message, the subscriber MS sends 710 an acknowledgement message (Acknowledge) to the VMSC of its own location area to notify it that the short message transmission has been successful, and the VMSC forwards 711 the acknowledgement message to the GMSC/IWMSC, from which the acknowledgement message is forwarded 712 to the originating SC of the short message.

Figure 8:
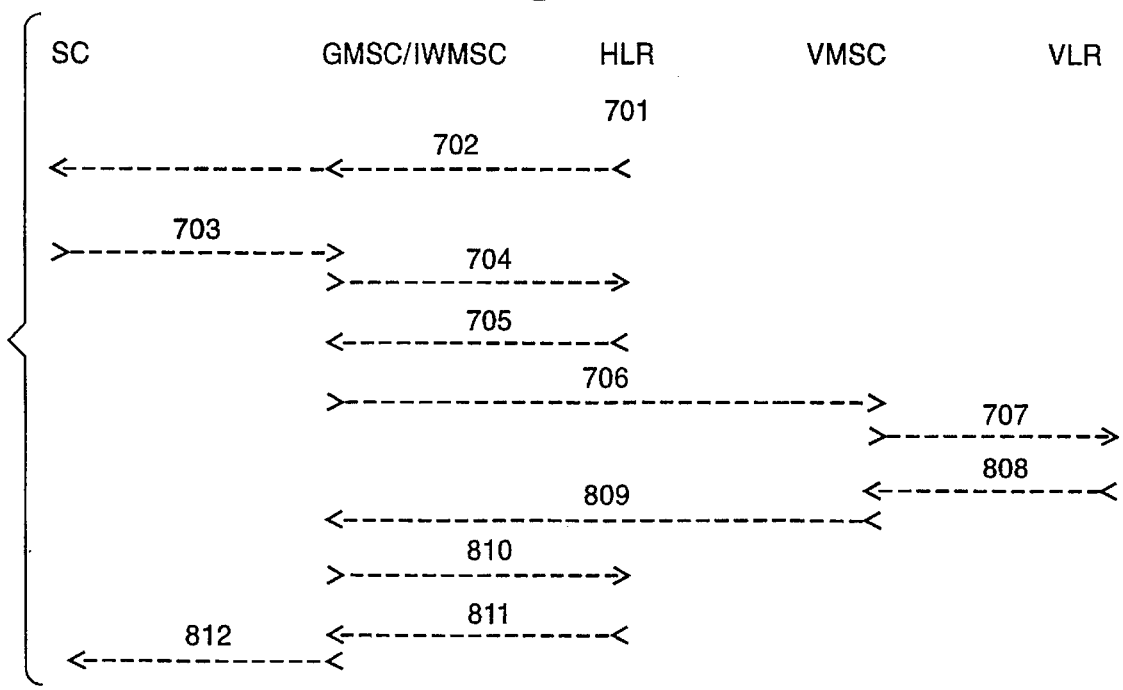
FIG. 8 is a signalling and transaction diagram illustrating a method according to the invention in which the starting of short message transmissions depends on the expiry of time supervision in a situation when the subscriber is not reachable.

FIG. 8 shows a signalling and transaction diagram illustrating the method according to the invention, in which the starting of the transmission of a short message waiting to be transmitted in the SC depends on the expiry of the time supervision in a situation when the subscriber is not reachable. As to the steps 701 to 707, FIG. 8 is identical with the corresponding steps of FIG. 7. In step 808 in FIG. 8, the VLR of the assumed location area of the subscriber sends 808 a notification that the subscriber is not reachable (AbsentSubscriber) to the VMSC of the subscriber location area. The VMSC forwards 809 the message to the gateway MSC, which, on detecting that the short message transmission has failed due to the absent subscriber, sends a message (SetMessageWaitingData) to the HLR, and the HLR includes, in response to the message, the identity of the originating SC in the list of the identities of SCs storing short messages waiting to be transmitted, i.e. in the MWD list. After including the SC identity in the list, the HLR sends 811 an acknowledgement (SetMWDAcknowledge) to the gateway MSC to notify it of the procedure it has performed. The gateway MSC forwards 812 the acknowledgement to the SC that attempted to have the short message transmitted to the subscriber.

Figure 3:
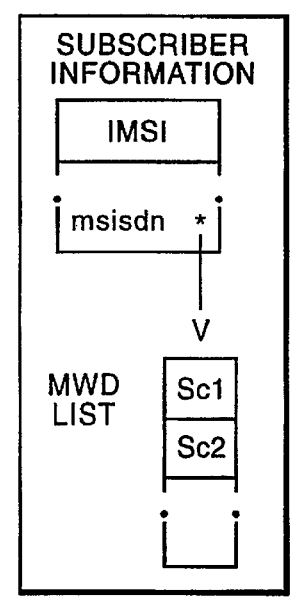
FIG. 3 shows a list of identities of SCs storing rejected short messages in a HLR of the mobile telephone network.
Figure 4:
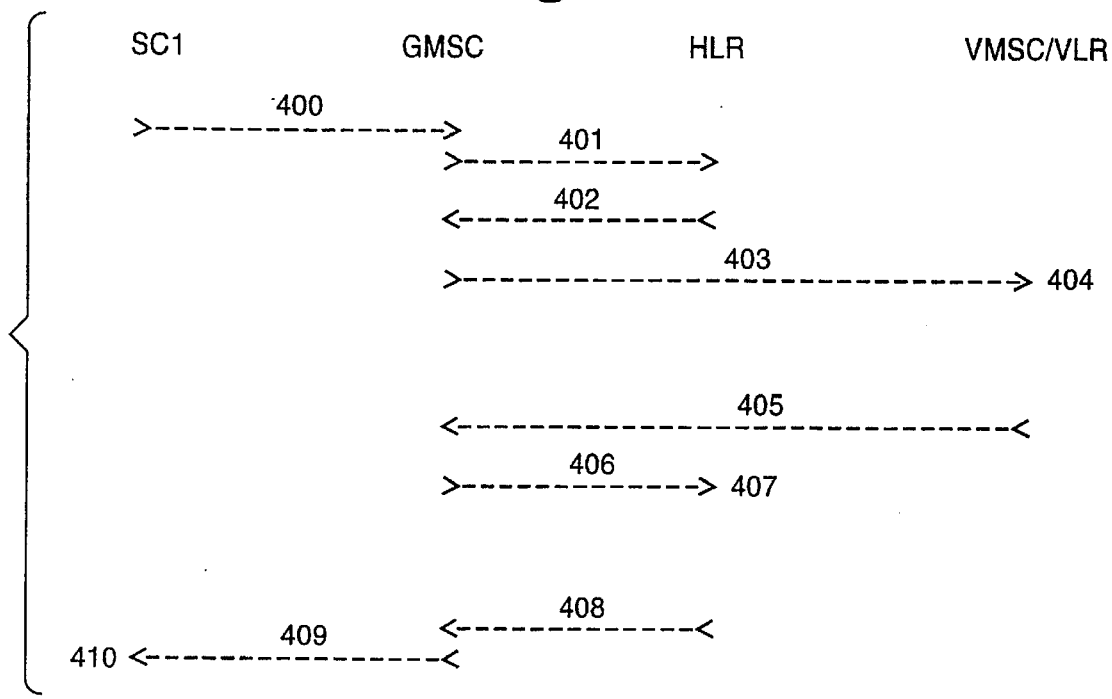
FIG. 4 is a signalling and transaction diagram illustrating a short message transmission when the subscriber is not reachable, and the identity of an SC that has made a short message transmission attempt through the network to the subscriber is included in the list of identities of SCs storing rejected short messages in the HLR of the subscriber.
Figure 5:
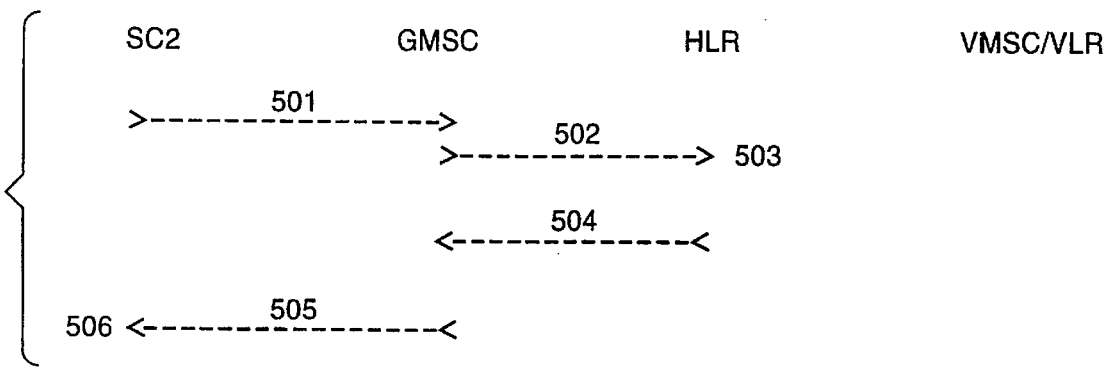
FIG. 5 is a signalling and transaction diagram illustrating a short message transmission when the subscriber is not reachable and the identity of an SC that has made a short message transmission attempt through the network to the subscriber has been included in the list of identities of SCs storing rejected short messages in the HLR of the subscriber.
Figure 6:
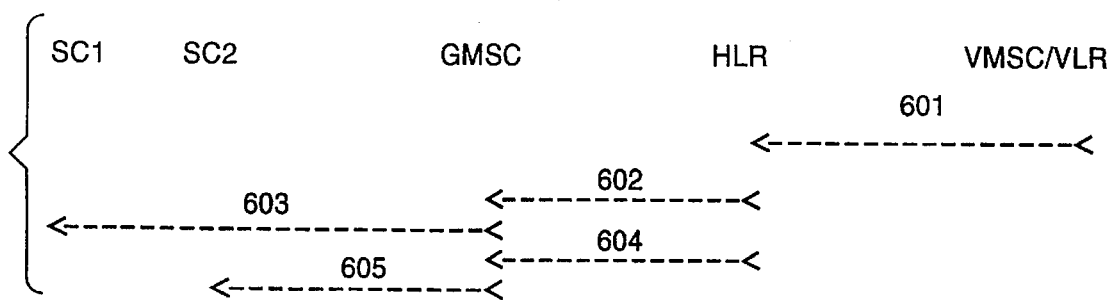
FIG. 6 is a signalling and transaction diagram illustrating the problem solved by the invention in a situation when the subscriber is again reachable.
Figure 9:
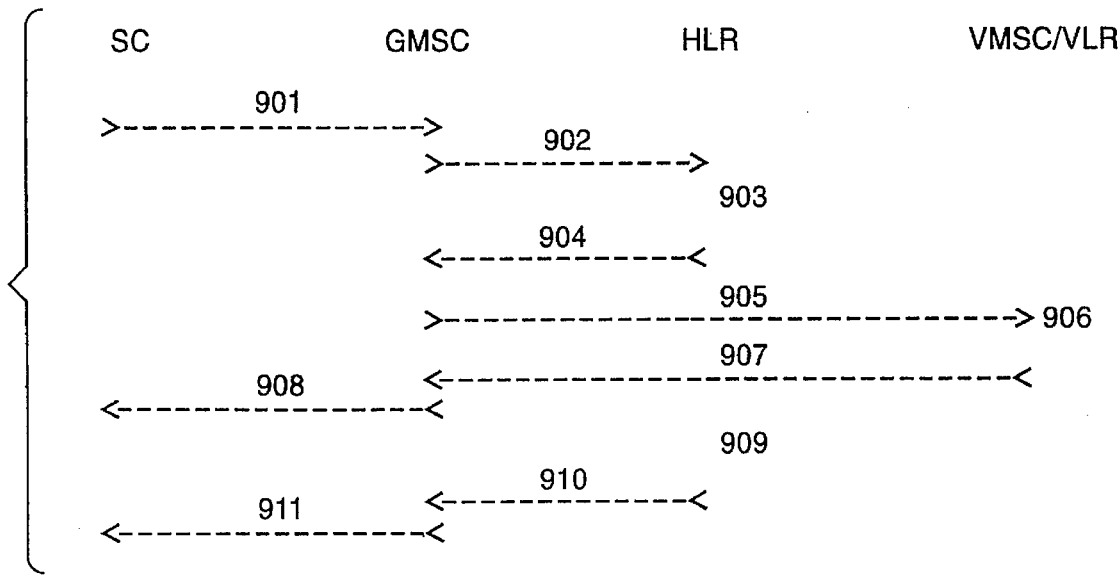
FIG. 9 is a signalling and transaction diagram illustrating a method according to another embodiment of the invention in a situation when the subscriber is again reachable, in which method the starting of the short message transmissions depends on the expiry of time supervision and on an attempt to send a new short message to the subscriber.

FIG. 9 is a signalling and transaction diagram illustrating a method according to another embodiment of the invention when the subscriber is again reachable, wherein the starting of short message transmissions depends on the expiry of time supervision and on an attempt to transmit a new short message to the subscriber. In this method according to the invention, the MWD list in the HLR of the subscriber includes addresses of SCs that have made an unsuccessful short message transmission attempt to the subscriber, and the identity of the SC has been included in the MWD list shown in FIG. 3 in a manner described at the end of the description referring to FIG. 8. The operation starts when the SC sends 901 a short message (ShortMessage) acting as an "impulse" to the gateway MSC, which sends 902 a routing information request message (SendRoutingInfoForSM) to the HLR of the subscriber. The HLR detects 903 not only that the MWD list of the subscriber includes SC addresses but also that the oldest SC identities have been on the list longer than what is allowed by the time supervision set in the identities in the system according to the invention. Thereby, as the time supervision has expired, the HLR exceptionally sends 904 the subscriber routing information (RoutingInfo) to the requesting gateway MSC. At the same time, the time supervision is set in the HLR to wait for the SetMWD operation, i.e. a message sent from the gateway MSC to notify the HLR that the short message transmission has failed, and that the HLR should include the address of the originating SC in the MWD list of the subscriber.

Upon receiving the routing information (RoutingInfo) from the HLR, the gateway MSC sends 905 a short message (ForwardShortMessage) to the VMSC/VLR, the identity of which was included in the routing information message from the HLR and within the service area of the MSC of which the subscriber is assumed to reside. The VMSC/VLR sends 906 a short message to the subscriber and upon receiving an acknowledgement of the successful transmission of short message, the VMSC/VLR sends 907 an acknowledgement message (ForwardShortMessageAcknowledge) to the gateway MSC as an indication of the successful transmission, and the gateway MSC forwards 908 an acknowledgement message (ShortMessageAck) indicating a successful short message transmission to the SC.

As mentioned above, the time supervision was set in step 903 in the HLR of the subscriber to supervise the SetMWD operation. Now, if the time supervision expires 909, as the gateway MSC has not sent to the HLR the SetMessageWaitingData message indicating an unsuccessful short message transmission and causing the identity of the SC which originated the unsuccessful short message transmission to be included in the MWD list of the HLR, the HLR starts to transmit 910 short message transmission starting messages (AlertSC) to all of the SCs the identity of which is included in the MWD list of the subscriber. The starting messages (AlertSC) are sent 910 first to the gateway MSCs, which forward 911 the starting messages to the respective SCs.

Figure 2:
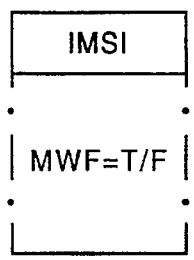
FIG. 2 shows a message waiting flag of a VLR in the mobile telephone network.
Figure 10:
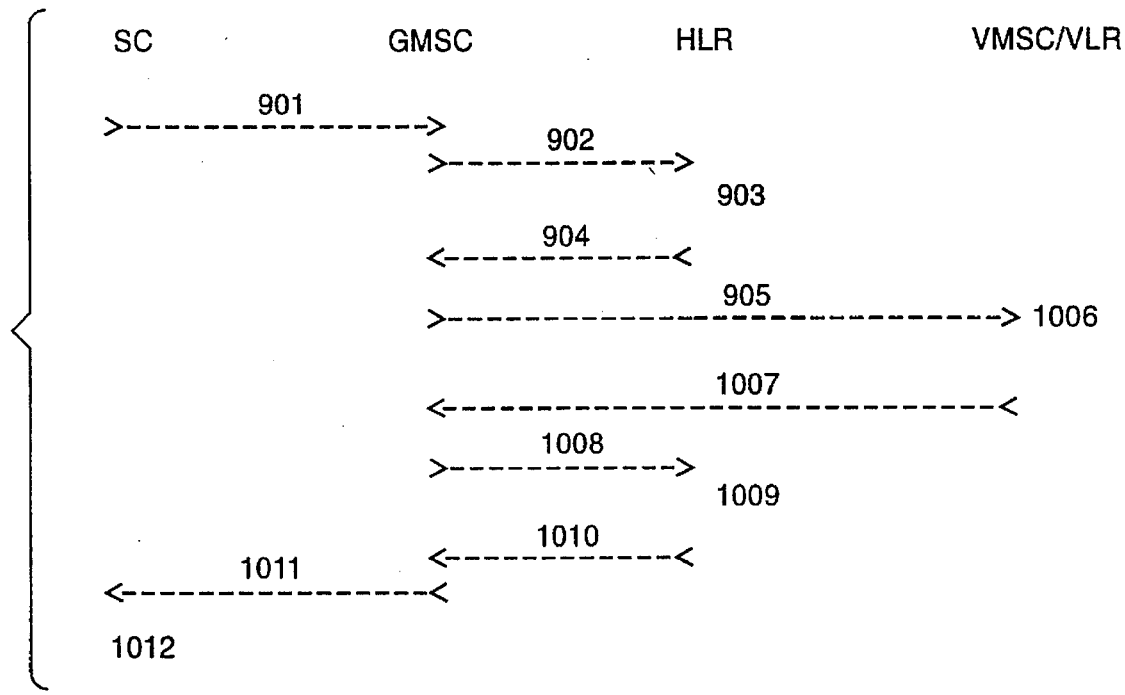
FIG. 10 is a signalling and transaction diagram illustrating a method according to another embodiment of the invention in a situation when the subscriber is not reachable, in which method the starting of the short message transmissions depends on the expiry of time supervision and upon an attempt to send a new short message to the subscriber.

FIG. 10 is a signalling and transaction diagram illustrating a method according to another embodiment of the invention when the subscriber is not reachable, in which method the starting of the short message transmissions depends on the expiry of time supervision and on an attempt to transmit a new short message to the subscriber. As to steps 901 to 905, FIG. 10 is identical with the corresponding steps of FIG. 8. In the solution of FIG. 10, the MSC of the subscriber location area detects 1006 in step 1006 that the subscriber is not reachable and sets the Message Waiting Flag shown in FIG. 2 to the position "True" so as to indicate that an unsuccessful short message transmission attempt has been made to the subscriber. Furthermore, the VMSC/VLR sends 1007 an acknowledgement message (ForwardShortMessageNegativeAcknowledge) as an indication of an unsuccessful short message transmission attempt to the gateway MSC, which, on observing that the short message transmission has failed, sends to the HLR a SetMessageWaitingData message as an indication of the unsuccessful short message transmission, and the HLR includes, in response to the SetMessageWaitingData message, the identity of the SC which made the unsuccessful short message transmission attempt in its MWD list.

As appears from above, the time supervision was set in the step of FIG. 10 identical with the step 903 of FIG. 9 to wait for a message from the gateway MSC for the initiation of the SetMWD operation. Now, in the case of FIG. 10, as the SetMessageWaitingData message sent 1008 by the gateway MSC is received in step 1019, the HLR includes the identity of the "new" SC which made the unsuccessful short message transmission attempt in the MWD list of the subscriber shown in FIG. 3. The time supervision, which was set to supervise the reception of the SetMessageWaitingData message is also deleted. In addition, time supervision is set to measure the time for which there has been SC addresses on the MWD list of a specific subscriber.

FIG. 11 is a block diagram illustrating an HLR according to the invention in a mobile telephone network. The HLR communicates with the other network elements of the mobile telephone network via a mobile applications part (MAP) 1101. The MAP 1101 forwards the received messages to a subscriber facility block 1102. The subscriber facility block 1102 comprises a subscriber database 1103 stored in a memory means 1103. The database 1103 contains information about each subscriber and the MWD list of each subscriber (MessageWaitingList) 1104, i.e. the list containing identities 1105 of SCs which have made an unsuccessful short message transmission attempt to a specific subscriber. The MWD list contains not only the subscriber identity 1106 and the SC identity 1105 but also a time stamp 1107 according to the invention, on the basis of which the system knows how long the identity 1105 of a specific SC has been included in the list 1104.

The subscriber facility block 1102 and the subscriber database 1103 have an associated means 1108 for processing identities of SCs the short message transmission of which has failed, i.e a means for processing the SC identities 1106 included in the MWD list. The means 1108 operates in the following way. When the HLR receives from the gateway MSC a routing information request message, i.e. a SendInfoForSM message, the subscriber facility block 1102 of the HLR requests 1111 the means 1108 for an authorization to provide the gateway MSC with the requested routing information. The means 1108 thereby checks 1109 whether there are SC identities 1105 on the MWD list of the subscriber. If the MWD list of the subscriber is empty, i.e. there are no short messages waiting to be transmitted to the subscriber in the SCs, the means 1108 asks from the checking means 1110 whether the first time supervision connected to the MWD list of the subscriber has expired, i.e., for instance, whether the time indicated by the time stamp 1107 has already elapsed. If the first time supervision has expired, the means 1108 authorizes the subscriber facility block 1102 to transmit the subscriber routing information to the gateway MSC.

The means 1108 also operates in the following way. When the HLR receives the SetMessageWaitingData message from the gateway MSC, whereby the gateway MSC notifies that the short message transmission has failed and wants to store the address of the SC which made the short message transmission attempt in the MWD list, the means 1108 checks 1109 whether the MWD list of the subscriber is empty and includes the new SC address in it. If the MWD list of the subscriber is empty, the means 1108 notifies 1113 the time supervision and checking means 1110 that the list is empty. If the MWD list is not empty, the means 1108 notifies 1115 a means 1114 which monitors the successful completion of the short message transmission.

When the HLR receives the NoteMSPresent message from the MSC of the subscriber location area, i.e. is notified that the subscriber has reentered the network, the subscriber facility block 1102 requests the means 1108 to retrieve the MWD list of the subscriber, i.e. to send a short message transmission starting message to all SCs the identity 1105 of which is included in the MWD list 1104 of the subscriber database 1103 of the subscriber. Similarly, when the second time supervision causing the HLR to wait for the SetMessageWaitingData message from the gateway MSC (described more fully above with reference to FIGS. 9 and 10) expires, the means 1114 requests the means 1108 for monitoring the successful completion of the short message transmission to retrieve the MWD list of the subscriber. In both cases, the means 1108 reads 1116 from the MWD list of the subscriber all SC identities contained in it, and requests 1117 a control means 1118 to start 1119 a means 1120 for transmitting short message transmission starting messages. This in fact takes place next, and the means 1120 for transmitting short message transmission starting messages transmits 1121 short message transmission starting messages, i.e. AlertSC messages, to the SCs included in the MWD list of the subscriber, which, in turn, start to transmit the stored short messages to the subscriber. In addition, the means 1108 notifies 1122 the time supervision and checking means that the MWD list of the subscriber has become empty.

The time supervision and checking means 1110 operates in the following way. Upon receiving a request, the time supervision and checking means 1110 for the time stamp in the MWD list of the subscriber checks the time stamp and notifies the requesting unit whether the time stamp attached to the MWD list of the subscriber has expired or whether there is still time left before the expiry. If the time stamp has expired, i.e. the first time supervision has elapsed, the time supervision and checking means sets a second time supervision that supervises the reception of a SetMWD message from the gateway MSC. If this time supervision expires, the time supervision and checking means 1110 notifies the means 1114 for monitoring the successful completion of short message transmission that this has happened.

When the time supervision and checking means 110 receives a notification 1113 from the means 1108 for processing the SC identities on the MWD list that a SC address has been included in the MWD list of the subscriber, the time supervision and checking means 1110 set the time stamp in the MWD list of the subscriber to a time which is equal to a current time incremented by a desired time. It is to be noted that the time supervision may also be performed in a manner different from the above time supervision based on time stamps.

Furthermore, when the time supervision and checking means 1110 receives the notification 1113 from the means 1108 for processing the SC identities on the MWD list that there are no SC identities on the MWD list of the subscriber, the supervision and checking means deletes the time in the time stamp of the MWD list of the subscriber, i.e. sets the time stamp to zero.

When the means 1114 for monitoring the successful completion of short message transmission receives a notification from the means 1108 for processing the SC identities on the MWD list that the SetMWD message has been received from the gateway MSC, the means 1114 for monitoring the successful completion of short message transmission requests 1123 the time supervision and checking means 1110 to delete the second time supervision set by it to supervise the reception of the SetMWD message from the gateway MSC.

On the contrary, if the second time supervision set to supervise the reception of the SetMWD message from the gateway MSC expires before the HLR receives the SetMWD message from the gateway MSC, the time supervision and checking means 1110 notifies the means 1114 for monitoring the successful completion of short message transmission that the time supervision has expired, and the means 1114 requests 1124 the means 1108 for processing the SC identities on the MWD list to read the SC identities contained in the MWD list of the subscriber and to start the transmission of short message transmission starting messages to these SCs. The means 1108 thereby reads the identities from the MWD list of the subscriber and transmits 1117 them to the control means 1118, which starts 1119 the means 1120 for transmitting short message transmission starting messages, and this further requests 1121 the subscriber facility block 1102 to transmit short message transmission starting messages to the SCs the identities of which are on the MWD list of the subscriber.

The drawings and the description related to them are only intended to illustrate the idea of the invention. In their details, the method according to the invention for starting a short message transmission in a mobile telephone network and the HLR of the mobile telephone system may vary within the scope of the claims. Even though the invention has been described above mainly referring to the GSM mobile telephone system, it is equally applicable in other kinds of telecommunications systems.

I claim:

1. A method for starting a short message transmission in a mobile telephone network comprising at least one short message service centre having an identity and transmitting short messages; at least one gateway mobile exchange for forwarding short messages to another network or to a short message service center; at least one mobile exchange forwarding short messages; a subscriber capable of receiving short messages; and a home location register having a subscriber-specific list of the identity of each said short message service centre that has transmitted a rejected short message, a subscriber-specific short message transmission starting message from the home location register activating a respective said short message service centre to transmit a respective short message to the gateway mobile exchange in order for each respective short message to be forwarded to the subscriber, and the rejected short messages being stored in a respective said short message service centre, the method comprising:

starting a time supervision when the identity of the respective said short message service centre is included in said subscriber-specific list;

transmitting a subscriber-specific short message transmission starting message to each said short message service centre having its identity on said subscriber-specific list when a time preset in said time supervision expires;

deleting the identity of a respective said short message service centre to which said short message transmission starting message has been transmitted from said subscriber-specific list of said home location register, of the respective identity of each respective said short message service centre that has transmitted a rejected short message; and transmitting by the respective said short message service centre transmits, in response to said short message transmission starting message, a short message to said gateway mobile exchange for forwarding to said subscriber.

2. The method according to claim 1, wherein, when said subscriber is reachable:

receiving by a respective said mobile exchange within a respective mobile subscriber location area said short message from the respective said short message service centre and forwarding said short message to said subscriber.

3. The method according to claim 1, wherein, when said subscriber is not reachable:

receiving by said gateway mobile exchange said short message from the respective said short message service centre and requesting routing information from said home location register of said subscriber, for forwarding the respective said short message;

upon receiving said routing information, forwarding by said gateway mobile exchange the respective said short message to a respective said mobile exchange within the respective said subscriber location area;

requesting by the respective said mobile exchange within the respective said subscriber location area information about said subscriber from a visitor location register within the respective said subscriber location area, and thereby becoming informed that said subscriber is not reachable;

including in said subscriber-specific list of said home location register the identity of the respective short message service centre which transmitted the respective short message to the respective said mobile exchange within the respective said subscriber location area for forwarding to said subscriber subscriber-specific list the identity of each said short message service centre that has transmitted a respective rejected short message;

notifying a respective said short message service centre that transmitted the respective short message that the transmission of the respective short message to the subscriber has failed.

4. A method for starting a short message transmission in a mobile telephone network comprising at least one short message service centre having an identity and transmitting short messages; at least one gateway mobile exchange for forwarding short messages to and from another network; at least one mobile exchange forwarding short messages; a subscriber capable of receiving short messages; and a home location register having a subscriber-specific list of the identity of each said short message service centre that has transmitted a respective rejected short message, a subscriber-specific short message transmission starting message from the home location register activating the respective said short message service centre to transmit a short message to said gateway mobile exchange in order for each respective short message to be forwarded to the subscriber, and the rejected short messages being stored in a respective said short message service centre, the method comprising:

starting a time supervision when the identity of the respective said short message service centre is included in said subscriber-specific list;

when the time preset in the time supervision expires, transmitting by the home location register, in response to a routing information request message from the respective said mobile exchange that has received the respective short message to be forwarded from the respective said short message service centre, routing information required for forwarding the respective short message to said subscriber to said gateway mobile exchange, and attempting by said gateway mobile exchange to transmit the respective short message to said subscriber.

5. The method according to claim 4, wherein, when said subscriber is reachable:

transmitting a subscriber-specific short message transmission starting message to each said short message service centre the identity of which is included in said subscriber-specific list of said home location register of the identity of each short message service centre that has transmitted a rejected short message;

deleting the identity of the respective said short message service centre to which a short message transmission starting message has been transmitted from said list contained in said home location register;

transmitting by each said short message service centre, in response to said short message transmission starting message, the respective short message to said gateway mobile exchange for forwarding to said subscriber.

6. The method according to claim 5, further including:

when the time preset in said time supervision expires, starting by said home location register a second time supervision in response to a routing information request message from said gateway mobile exchange that has received a respective short message to be forwarded from a respective said short message service centre;

when the time preset in said second time supervision expires, transmitting a subscriber-specific short message transmission starting message to each said short message service centre the identity of which is included in said subscriber-specific list of said home location;

deleting the identity of the respective said short message service centre to which said short message transmission starting message has been transmitted from said subscriber-specific list of said home location register of the identity of each said short message service centre that has transmitted a respective rejected short message;

transmitting by each said short message service centre, in response to said short message transmission starting message, the respective short message to said gateway mobile exchange for forwarding to said subscriber.

7. The method according to claim 4, wherein, when said subscriber is not reachable:

including by said home location register, in response to a short message waiting indication message, the identity of the respective said short message service centre which has transmitted the respective said short message to the gateway mobile exchange in said subscriber-specific list the identity of each said short message service centre that has transmitted a respective short message;

transmitting by said gateway mobile exchange a negative acknowledgement message indicating a failed short message transmission to the respective said short message service centre from which the respective said short message has been transmitted.

8. The method according to claim 7, further comprising:

when the time preset in said time supervision expires, starting by said home location register a second time supervision in response to a routing information request message from said gateway mobile exchange which has received a respective short message for forwarding from a respective said short message service centre;

before the time preset in said second time supervision expires, receiving by said home location register a short message waiting indication message from said gateway mobile exchange and restarting said time supervision and including short message service centre identity in said list;

stopping by said home location register of said second time supervision;

transmitting by said home location register an acknowledgement message for said short message waiting indication message to said gateway mobile exchange which transmitted said short message waiting indication message;

transmitting by said gateway mobile exchange a negative short message transmission acknowledgement message to the respective said short message service centre that transmitted the respective said short message.

9. A home location register in a mobile telephone system, comprising:

a memory means for storing subscriber information in a subscriber database and a subscriber-specific list of identities of short message service centres that have transmitted rejected short messages;

a subscriber facility unit for forwarding messages between said subscriber database and other components of said mobile telephone system;

a means for processing said identities of the short message service centres that have transmitted rejected short messages;

a means for transmitting a short message transmission starting message to a respective said short message service centre which has transmitted a respective rejected short message;

a control means for controlling said means for transmitting a short message transmission starting message so that said means for transmitting will transmit a short message transmission starting message to the respective said short message service centre;

a means for starting a first time supervision associated with the respective said short message service that has transmitted the respective rejected short message stored in the memory means; and a means for checking the expiration of said first time supervision in response to a short message transmission routing information request message from a gateway mobile exchange, and activating, in response to said expiration, said control means for said means for transmitting a short message transmission starting message so that it will activate the transmission of a short message transmission starting message to the respective short message service centre.

10. The home location register according to claim 9, further comprising:

a means for monitoring successful completion of short message transmission, which is arranged, upon detecting a successful short message transmission, to start the transmission of a short message transmission starting message to the respective said short message service centre, and is arranged upon detecting an unsuccessful short message transmission, restarts said first time supervision.

11. A home location register according to claim 10, wherein:

said time supervision checking means is further arranged to monitor the reception of the short message waiting indication message notifying of an unsuccessful transmission of a short message transmitted from the gateway mobile exchange to said home location register and containing the identity of the respective short message service centre from which the respective short message was transmitted.

* * * * *